US012738189B2

(12) United States Patent
Hsieh et al.

(10) Patent No.: US 12,738,189 B2
(45) Date of Patent: Sep. 15, 2026

(54) LIGHT EMISSION CONTROL METHOD CAPABLE OF ALLEVIATING HIGH CONTRAST COUPLING

(71) Applicant: MACROBLOCK, INC., Hsinchu (TW)

(72) Inventors: Chi-Min Hsieh, Hsinchu (TW); Ming-Jia Wu, Hsinchu (TW); Wei-Hsiang Cheng, Hsinchu (TW); Fu-Chuan Ni, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

(21) Appl. No.: 19/228,007

(22) Filed: Jun. 4, 2025

(65) Prior Publication Data

US 2025/0378773 A1 Dec. 11, 2025

(30) Foreign Application Priority Data

Jun. 11, 2024 (TW) ................................ 113121536

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2320/0233* (2013.01); *G09G 2320/064* (2013.01)

(58) Field of Classification Search
None
See application file for complete search history.

(56) References Cited

U.S. PATENT DOCUMENTS

2025/0239200 A1 * 7/2025 Hsieh .................. G09G 3/2007

* cited by examiner

*Primary Examiner* — Ifedayo B Iluyomade
(74) *Attorney, Agent, or Firm* — Nixon & Vanderhye PC

(57) ABSTRACT

A light emission control method includes: (A) generating M sub-frames based on an image frame, where, with respect to each of multiple light emitting elements, a sum of partial gray values of the light emitting element that are respectively contained in N ones of the sub-frames is equal to a frame gray value of the light emitting element that is contained in the image frame, and 0<N≤M; (B) obtaining a display set arrangement that indicates which one(s) of the light emitting elements is/are included in each of multiple display sets; (C) obtaining a display order of the sub-frames in M display time intervals, where the display order indicates, with respect to each display set, a one-to-one corresponding relationship between the sub-frames and the display time intervals; and (D) in each display time interval, controlling each display set to display one of the sub-frames that corresponds to the display time interval.

16 Claims, 8 Drawing Sheets

T1

| | CH1 | CH2 | CH3 | CH4 |
|---|---|---|---|---|
| SC1 | 1 | 0 | 1 | 0 |
| SC2 | 1 | 0 | 0 | 0 |

+

T9

| | CH1 | CH2 | CH3 | CH4 |
|---|---|---|---|---|
| SC1 | 0 | 1 | 0 | 1 |
| SC2 | 0 | 0 | 0 | 0 |

display order of sub-frames

11

| | | | | | | | | | | | | | | | | | | |
|---|---|---|---|---|---|---|---|---|---|---|---|---|---|---|---|---|---|---|
| first display set | 1 | | 2 | | 3 | | 4 | | 5 | | 6 | | 7 | | 8 | | 9 (C=1) | |
| second display set | 9 (C=1) | | 8 | | 7 | | 6 | | 5 | | 4 | | 3 | | 2 | | 1 | |
| display time interval | T1 | | T2 | | T3 | | T4 | | T5 | | T6 | | T7 | | T8 | | T9 | |
| scan line | SC1 | SC2 | SC1 | SC2 | SC1 | SC2 | SC1 | SC2 | SC1 | SC2 | SC1 | SC2 | SC1 | SC2 | SC1 | SC2 | SC1 | SC2 |

12

FIG. 5

12 display order of sub-frames

| | | | | | | | | | | | | | | | | |
|---|---|---|---|---|---|---|---|---|---|---|---|---|---|---|---|---|
| first display set | 1 | | 2 | | 3 | | 4 | | 5 | | 6 | | 7 | | 8 (E=1) | |
| second display set | 8 (E=1) | | 7 | | 6 | | 5 | | 4 | | 3 | | 2 | | 1 | |
| display time interval | T1 | | T2 | | T3 | | T4 | | T5 | | T6 | | T7 | | T8 | |
| scan line | SC1 | SC2 | SC1 | SC2 | SC1 | SC2 | SC1 | SC2 | SC1 | SC2 | SC1 | SC2 | SC1 | SC2 | SC1 | SC2 |

LIGHT EMISSION CONTROL METHOD CAPABLE OF ALLEVIATING HIGH CONTRAST COUPLING

CROSS-REFERENCE TO RELATED APPLICATION

This application claims priority to Taiwanese Invention Patent Application No. 113121536, filed on Jun. 11, 2024, the entire disclosure of which is incorporated by reference herein.

FIELD

The disclosure relates to display techniques, and more particularly to a light emission control method capable of alleviating high contrast coupling.

BACKGROUND

Referring to FIG. 1, eight sub-frames (including a first sub-frame to an eighth sub-frame) are generated from an image frame, and are respectively displayed by a display in eight display time intervals (T1-T8) of a display time period. The display is controlled through two scan lines (S1, S2) and four channel lines (C1-C4), and includes eight light emitting elements that are arranged in a matrix having two rows and four columns. The light emitting elements in a $p^{th}$ one of the rows are connected to a $p^{th}$ one of the scan lines (Sp), where $1 \le p \le 2$. The light emitting elements in a $q^{th}$ one of the columns are connected to a $q^{th}$ one of the channel lines (Cq), where $1 \le q \le 4$. The image frame contains frame gray values of the light emitting elements, each of which falls within a range of zero to F, where F is the maximum gray value that can be displayed by the light emitting elements. Each of the sub-frames contains partial gray values of the light emitting elements.

In a first case where the frame gray values of the four light emitting elements that are connected to the scan line (S1) and respectively to the channel lines (C1-C4) are (1,1,1,1), and where the frame gray values of the four light emitting elements that are connected to the scan line (S2) and respectively to the channel lines (C1-C4) are (1,0,0,0): with respect to the first sub-frame, the partial gray values of the four light emitting elements that are connected to the scan line (S1) and respectively to the channel lines (C1-C4) are (1,1,1,1), and the partial gray values of the four light emitting elements that are connected to the scan line (S2) and respectively to the channel lines (C1-C4) are (1,0,0,0); and with respect to each of the second sub-frame to the eighth sub-frame, the partial gray values of the four light emitting elements that are connected to the scan line (S1) and respectively to the channel lines (C1-C4) are (0,0,0,0), and the partial gray values of the four light emitting elements that are connected to the scan line (S2) and respectively to the channel lines (C1-C4) are (0,0,0,0).

In a second case where the frame gray values of the four light emitting elements that are connected to the scan line (S1) and respectively to the channel lines (C1-C4) are (1,1,1,1), and where the frame gray values of the four light emitting elements that are connected to the scan line (S2) and respectively to the channel lines (C1-C4) are (1,F,F,F): with respect to the first sub-frame, the partial gray values of the four light emitting elements that are connected to the scan line (S1) and respectively to the channel lines (C1-C4) are (1,1,1,1), and the partial gray values of the four light emitting elements that are connected to the scan line (S2) and respectively to the channel lines (C1-C4) are (1,f,f,f); and with respect to each of the second sub-frame to the eighth sub-frame, the partial gray values of the four light emitting elements that are connected to the scan line (S1) and respectively to the channel lines (C1-C4) are (0,0,0,0), and the partial gray values of the four light emitting elements that are connected to the scan line (S2) and respectively to the channel lines (C1-C4) are (0,f,f,f), where f=F/8.

With respect to the four light emitting elements that are connected to the same one of the scan lines (S1/S2) and respectively to the channel lines (C1-C4), current signals that respectively flow through the channel lines (C1-C4) may interfere with each other and result in high contrast coupling. Therefore, for any one of the four light emitting elements that displays a non-zero partial gray value, the light emitting element may be driven by a current signal that has a magnitude different from an expected current magnitude corresponding to the partial gray value, and may have a brightness different from an expected brightness corresponding to the partial gray value.

In the second case, during the display time interval (T1), the four light emitting elements that are connected to the scan line (S1) respectively display the partial gray values of (1,1,1,1), and the four light emitting elements that are connected to the scan line (S2) respectively display the partial gray values of (1,f,f,f). Although the two light emitting elements that are connected to the channel line (C1) display the same partial gray value of 1, the two light emitting elements that are connected to the channel line (C1) face different environments (i.e., a combination of the partial gray values of (1,1,1) displayed by the three light emitting elements that are connected to the scan line (S1) and respectively to the channel lines (C2-C4) (also referred to as a first combination) is different from a combination of the partial gray values of (f,f,f) displayed by the three light emitting elements that are connected to the scan line (S2) and respectively to the channel lines (C2-C4) (also referred to as a second combination)), so the two light emitting elements that are connected to the channel line (C1) would have different brightnesses. The brightness difference between the two light emitting elements that are connected to the channel line (C1) increases with an increase of the difference between the first combination and the second combination. This would degrade picture quality of the display.

SUMMARY

Therefore, an object of the disclosure is to provide a light emission control method that can alleviate the drawback of the prior art.

According to an aspect of the disclosure, the light emission control method is to be implemented by a driver circuit, and is for controlling a display. The display includes a plurality of light emitting elements that are to be divided into a plurality of display sets. The light emission control method includes steps of: (A) generating a number (M) of sub-frames based on an image frame, where $M=2^B+C=(N+E)+C$, in which $B>0$, $N>0$, $E\ge 0$, and $C\ge 0$, the image frame corresponds to a display time period, and contains frame gray values of the plurality of light emitting elements, the display time period includes a number (M) of display time intervals, each of the number (M) of sub-frames contains partial gray values of the plurality of light emitting elements, and with respect to each of the plurality of light emitting elements, the partial gray value of the light emitting element that is contained in each of a first one to an $N^{th}$ one of the number (M) of sub-frames is greater than or equal to zero, and a sum of the partial gray values of the light emitting element that are respectively contained in the first one to the $N^{th}$ one of the number (M) of sub-frames is equal to the frame gray value of the light emitting element; (B) obtaining a display set arrangement that indicates which one(s) of the plurality of light emitting elements is/are included in each of the plurality of display sets; (C) obtaining a display order of the number (M) of sub-frames in the number (M) of display time intervals, where the display order indicates, with respect to each of the plurality of display sets, a one-to-one corresponding relationship between the number (M) of sub-frames and the number (M) of display time intervals, and the one-to-one corresponding relationships indicated by the display order with respect to the plurality of display sets are different from each other; and (D) in each of the number (M) of display time intervals, controlling each of the plurality of display sets as indicated by the display set arrangement to display one of the number (M) of sub-frames that corresponds to the display time interval according to the one-to-one corresponding relationship indicated by the display order with respect to the display set.

According to another aspect of the disclosure, the light emission control method is to be implemented by a driver circuit, and is for controlling a display. The display includes a plurality of light emitting elements that are divided into a plurality of display sets. The light emission control method includes steps of: (A) generating a number (M) of sub-frames based on an image frame, where $M=2^B+C=(N+E)+C$, in which $B>0$, $N>0$, $E\geq 0$, and $C\geq 0$, the image frame corresponds to a display time period, and contains frame gray values of the plurality of light emitting elements, the display time period includes a number (M) of display time intervals, each of the number (M) of sub-frames contains partial gray values of the plurality of light emitting elements, and with respect to each of the plurality of light emitting elements, the partial gray value of the light emitting element that is contained in each of a first one to an $N^{th}$ one of the number (M) of sub-frames is greater than or equal to zero, and a sum of the partial gray values of the light emitting element that are respectively contained in the first one to the $N^{th}$ one of the number (M) of sub-frames is equal to the frame gray value of the light emitting element; and (B) in each of the number (M) of display time intervals, controlling each of the plurality of display sets to display one of the number (M) of sub-frames that corresponds to the display time interval, where with respect to each of the plurality of display sets, the number (M) of sub-frames correspond to the number (M) of display time intervals in a one-to-one corresponding relationship, and the one-to-one corresponding relationships with respect to the plurality of display sets are different from each other.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 5 is a schematic diagram illustrating a second example of the display order and the partial gray values displayed in various display time intervals of the embodiment.

DETAILED DESCRIPTION

Figure 1:
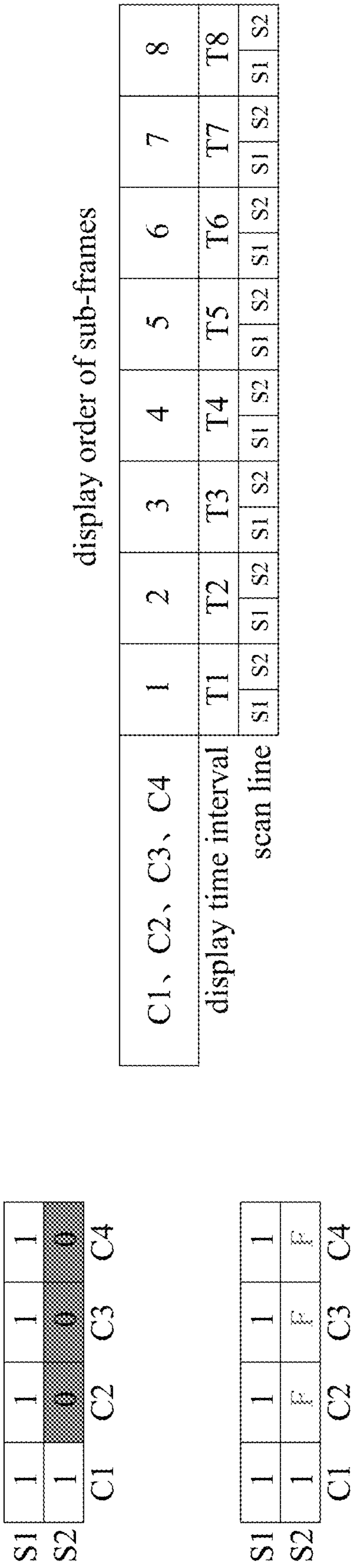
FIG. 1 PRIOR ART
FIG. 1 is a schematic diagram illustrating two image frames and a display order of the prior art.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
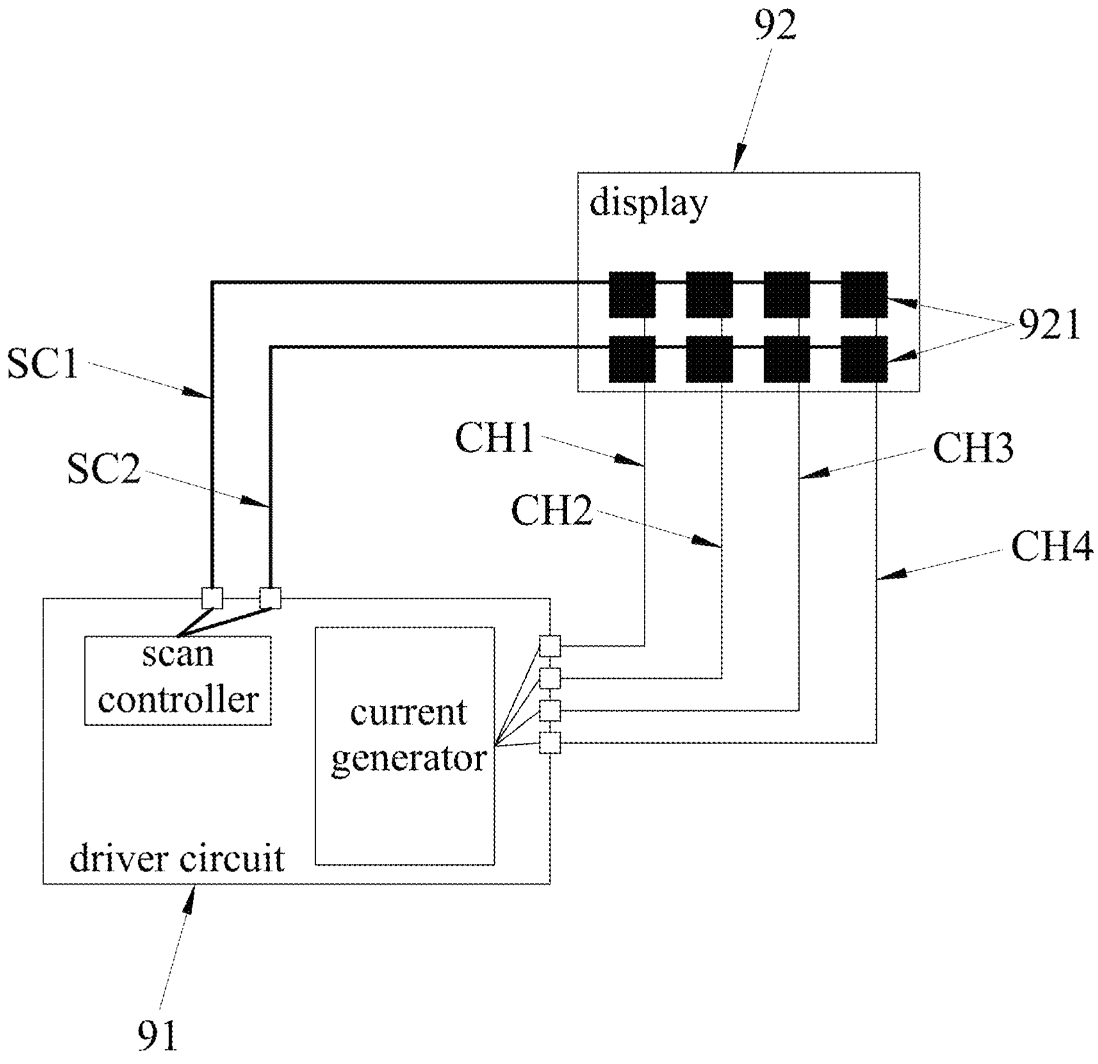
FIG. 2 is a block diagram illustrating a display device in which an embodiment of a light emission control method according to the disclosure is implemented.

Referring to FIG. 2, an embodiment of a light emission control method according to the disclosure is to be implemented in a display device. The display device includes a driver circuit 91 and a display 92 that are connected to each other through a number (P) of scan lines (SC1-SCP) and a number (Q) of channel lines (CH1-CHQ), where $P\geq 2$ and $Q\geq 2$. The driver circuit 91 includes a scan controller that is connected to the scan lines (SC1-SCP), and a current generator that is connected to the channel lines (CH1-CHQ). The display 92 includes a number ($P\times Q$) of light emitting elements 921. The light emitting elements 921 are arranged in a matrix that has a number (P) of rows and a number (Q) of columns. Each of the light emitting elements 921 includes, for example, a light emitting diode (LED). The light emitting elements 921 in a $p^{th}$ one of the rows are connected to a $p^{th}$ one of the scan lines (SCp), where $1\leq p\leq P$. The light emitting elements 921 in a $q^{th}$ one of the columns are connected to a $q^{th}$ one of the channel lines (CHq), where $1\leq q\leq Q$.

The light emitting elements 921 are to be divided into a plurality of display sets. Each of the light emitting elements 921 is assigned to one of the display sets. Each of the display sets includes at least one of the light emitting elements 921. For illustration purposes, in this embodiment, P=2, Q=4, and the light emitting elements 921 are to be divided into two display sets (including a first display set and a second display set).

Figure 3:
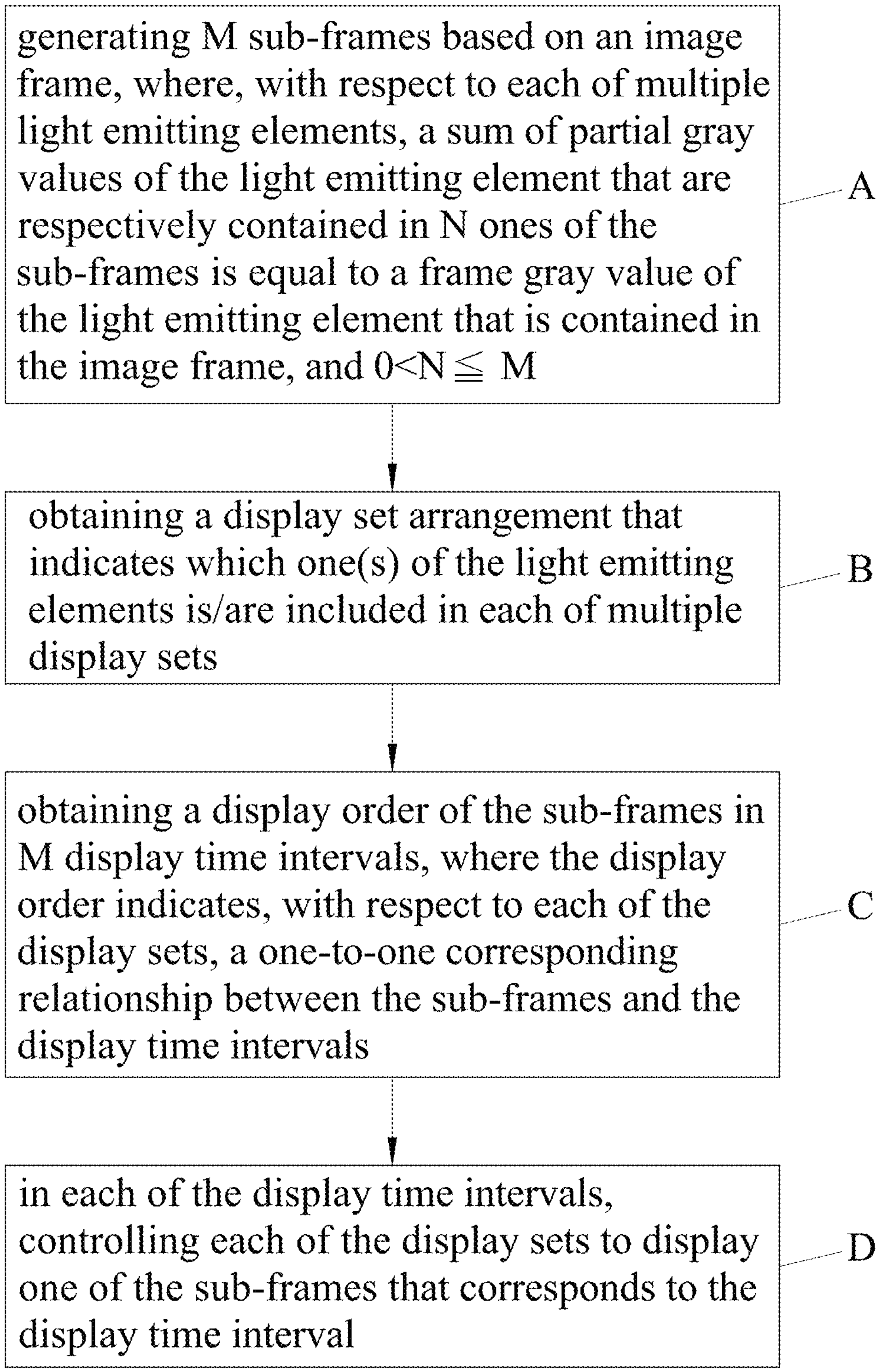
FIG. 3 is a flow chart illustrating the embodiment.

Referring to FIGS. 2 and 3, the driver circuit 91 is configured to receive an image frame, and to perform the light emission control method of this embodiment that includes steps (A-D) so as to control the display 92 to show the image frame.

In step (A), the driver circuit 91 generates a number (M) of sub-frames based on the image frame. $M=2^B+C=(N+E)+C$, in which $B>0$, $N>0$, $E\geq 0$, and $0\leq C\leq 2^B$. The image frame corresponds to a display time period, and contains frame gray values of the light emitting elements 921. The display time period includes a number (M) of display time intervals. Each of the sub-frames contains partial gray values of the light emitting elements 921. With respect to each of the light emitting elements 921: the partial gray value of the light emitting element that is contained in each of a first one to an $N^{th}$ one of the sub-frames is greater than or equal to zero; a sum of the partial gray values of the light emitting element that are respectively contained in the first one to the $N^{th}$ one of the sub-frames is equal to the frame gray value of the light emitting element; and when (E+C)>0, the partial gray value of the light emitting element that is contained in each of an $(N+1)^{th}$ one to an $M^{th}$ one of the sub-frames is zero.

In this embodiment, with respect to each of the light emitting elements 921, the frame gray value of the light emitting element 921 is cyclically allocated to the sub-frames from the first one to the $N^{th}$ one of the sub-frames by an amount, so as to obtain the partial gray values of the light emitting element 921 that are respectively contained in the first one to the $N^{th}$ one of the sub-frames. The amount is smaller than or equal to a predetermined value. Specifically, for each allocation of the frame gray value of the light emitting element 921 to one of the first one to the $N^{th}$ one of the sub-frames, the amount is equal to the predetermined value if a remaining portion of the frame gray value of the light emitting element 921 before the allocation is greater than or equal to the predetermined value, and is equal to the remaining portion of the frame gray value of the light emitting element 921 before the allocation if the remaining portion of the frame gray value of the light emitting element 921 before the allocation is smaller than the predetermined value. In an example, each of the frame gray values contained in the image frame is A-bits wide, the predetermined value is greater than or equal to one and is smaller than or equal to $2^A/N$, and each of the partial gray values contained in the first one to the $N^{th}$ one of the sub-frames is smaller than or equal to $2^A/N$.

In this embodiment, the driver circuit 91 stores a plurality of display set arrangements, and a plurality of display orders of the sub-frames in the display time intervals. Each of the display set arrangements indicates which one(s) of the light emitting elements 921 is/are included in each of the display sets. For each of the display orders: the display order indicates, with respect to each of the display sets, a one-to-one corresponding relationship between the sub-frames and the display time intervals; the one-to-one corresponding relationships indicated by the display order with respect to the display sets are different from each other; and in the one-to-one corresponding relationships indicated by the display order with respect to the display sets, the first one of the sub-frames corresponds to different ones of the display time intervals.

In step (B), the driver circuit 91 obtains one of the display set arrangements stored therein. For illustration purposes, in this embodiment, the display set arrangement obtained in step (B) indicates that the first display set includes the two light emitting elements 921 connected to the channel line (CH1) and the two light emitting elements 921 connected to the channel line (CH3), and that the second display set includes the two light emitting elements 921 connected to the channel line (CH2) and the two light emitting elements 921 connected to the channel line (CH4).

In step (C), the driver circuit 91 obtains one of the display orders stored therein. According to the display order obtained in step (C), any two of the light emitting elements 921 that are respectively assigned to two different ones of the display sets have different one-to-one corresponding relationships, and for any one of the display sets that includes at least two of the light emitting elements 921, the light emitting elements 921 of the display set have the same one-to-one corresponding relationship.

In step (D), in each of the display time intervals, the driver circuit 91 controls each of the display sets as indicated by the display set arrangement obtained in step (B) to display one of the sub-frames that corresponds to the display time interval according to the one-to-one corresponding relationship indicated by the display order obtained in step (C) with respect to the display set.

Although steps (B, C) are executed each time the light emission control method is performed in this embodiment, steps (B, C) may be executed when necessary in other embodiments.

Figure 4:
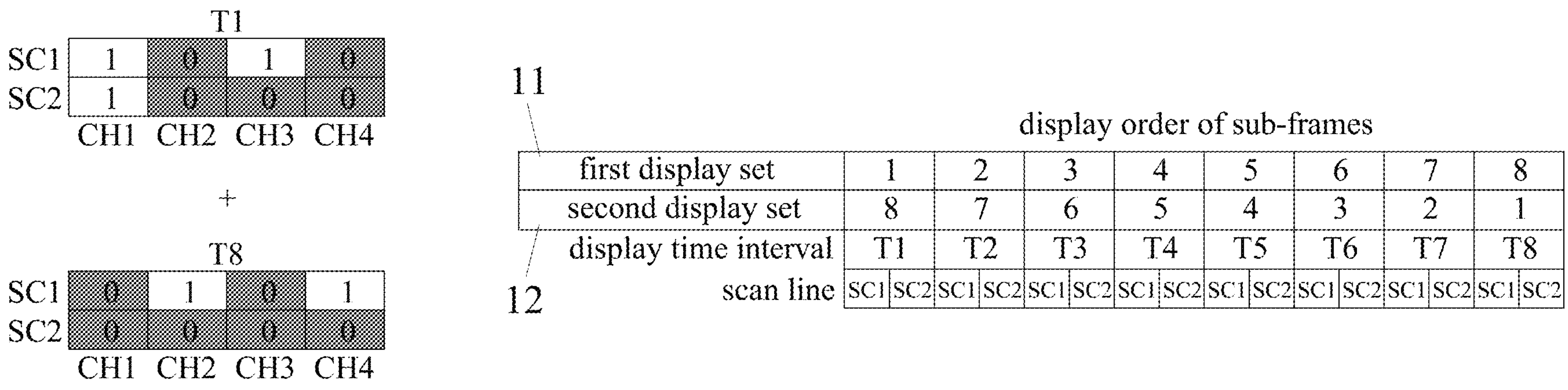
FIG. 4 is a schematic diagram illustrating a first example of a display order and multiple partial gray values displayed in various display time intervals of the embodiment.

In a first example as shown in FIG. 4, B=3, E=0, and C=0, so N=8, and M=8. The predetermined value is one. The frame gray values of the light emitting elements 921 that are connected to the scan line (SC1) and respectively to the channel lines (CH1-CH4) are (1,1,1,1). The frame gray values of the light emitting elements 921 that are connected to the scan line (SC2) and respectively to the channel lines (CH1-CH4) are (1,0,0,0). According to step (A): with respect to the first one of the sub-frames, the partial gray values of the four light emitting elements 921 that are connected to the scan line (SC1) and respectively to the channel lines (CH1-CH4) are (1,1,1,1), and the partial gray values of the four light emitting elements 921 that are connected to the scan line (SC2) and respectively to the channel lines (CH1-CH4) are (1,0,0,0); and with respect to each of the second one to the eighth one of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,0,0,0). According to step (C): the one-to-one corresponding relationship indicated by the display order obtained in step (C) with respect to the first display set 11 is that the first, second, third, fourth, fifth, sixth, seventh and eighth ones of the sub-frames respectively correspond to a first one to an eighth one of the display time intervals (T1-T8); and the one-to-one corresponding relationship indicated by the display order obtained in step (C) with respect to the second display set 12 is that the eighth, seventh, sixth, fifth, fourth, third, second and first ones of the sub-frames respectively correspond to the first to eighth ones of the display time intervals (T1-T8). According to step (D): in the first one of the display time intervals (T1), the four light emitting elements 921 of the first display set 11 display the corresponding partial gray values of the first one of the sub-frames, and the four light emitting elements 921 of the second display set 12 display the corresponding partial gray values of the eighth one of the sub-frames, that is, the four light emitting elements 921 that are connected to the scan line (SC1) and respectively to the channel lines (CH1-CH4) display the partial gray values of (1,0,1,0), and the four light emitting elements 921 that are connected to the scan line (SC2) and respectively to the channel lines (CH1-CH4) display the partial gray values of (1,0,0,0); in the second one of the display time intervals (T2), the four light emitting elements 921 of the first display set 11 display the corresponding partial gray values of the second one of the sub-frames, and the four light emitting elements 921 of the second display set 12 display the corresponding partial gray values of the seventh one of the sub-frames, that is, the four light emitting elements 921 that are connected to the scan line (SC1) and respectively to the channel lines (CH1-CH4) display the partial gray values of (0,0,0,0), and the four light emitting elements 921 that are connected to the scan line (SC2) and respectively to the channel lines (CH1-CH4) display the partial gray values of (0,0,0,0); and so on and so forth. Therefore, in the first one of the display time intervals (T1), a difference between a combination of the partial gray values of (0,1,0) displayed by the three light emitting elements 921 that are connected to the scan line (SC1) and respectively to the channel lines (CH2-CH4) and a combination of the partial gray values of (0,0,0) displayed by the three light emitting elements 921 that are connected to the scan line (SC2) and respectively to the channel lines (CH2-CH4) is reduced as compared to the first case of the prior art, so the high contrast coupling can be alleviated, and a brightness difference between the two light emitting elements 921 that are connected to the channel line (C1) can be reduced.

In a second example as shown in FIG. 5, B=3, E=0, and C=1, so N=8, and M=9. The predetermined value is one. The frame gray values of the light emitting elements 921 that are connected to the scan line (SC1) and respectively to the channel lines (CH1-CH4) are (1,1,1,1). The frame gray values of the light emitting elements 921 that are connected to the scan line (SC2) and respectively to the channel lines (CH1-CH4) are (1,0,0,0). According to step (A): with respect to the first one of the sub-frames, the partial gray values of the four light emitting elements 921 that are connected to the scan line (SC1) and respectively to the channel lines (CH1-CH4) are (1,1,1,1), and the partial gray values of the four light emitting elements 921 that are connected to the scan line (SC2) and respectively to the channel lines (CH1-CH4) are (1,0,0,0); and with respect to each of the second one to the ninth one of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,0,0,0). According to step (C): the one-to-one corresponding relationship indicated by the display order obtained in step (C) with respect to the first display set 11 is that the first, second, third, fourth, fifth, sixth, seventh, eighth and ninth ones of the sub-frames respectively correspond to a first one to a ninth one of the display time intervals (T1-T9); and the one-to-one corresponding relationship indicated by the display order obtained in step (C) with respect to the second display set 12 is that the ninth, eighth, seventh, sixth, fifth, fourth, third, second and first ones of the sub-frames respectively correspond to the first to ninth ones of the display time intervals (T1-T9). According to step (D): in the first one of the display time intervals (T1), the four light emitting elements 921 of the first display set 11 display the corresponding partial gray values of the first one of the sub-frames, and the four light emitting elements 921 of the second display set 12 display the corresponding partial gray values of the ninth one of the sub-frames, that is, the four light emitting elements 921 that are connected to the scan line (SC1) and respectively to the channel lines (CH1-CH4) display the partial gray values of (1,0,1,0), and the four light emitting elements 921 that are connected to the scan line (SC2) and respectively to the channel lines (CH1-CH4) display the partial gray values of (1,0,0,0); in the second one of the display time intervals (T2), the four light emitting elements 921 of the first display set 11 display the corresponding partial gray values of the second one of the sub-frames, and the four light emitting elements 921 of the second display set 12 display the corresponding partial gray values of the eighth one of the sub-frames, that is, the four light emitting elements 921 that are connected to the scan line (SC1) and respectively to the channel lines (CH1-CH4) display the partial gray values of (0,0,0,0), and the four light emitting elements 921 that are connected to the scan line (SC2) and respectively to the channel lines (CH1-CH4) display the partial gray values of (0,0,0,0); and so on and so forth. Therefore, in the first one of the display time intervals (T1), the difference between the combination of the partial gray values of (0,1,0) displayed by the three light emitting elements 921 that are connected to the scan line (SC1) and respectively to the channel lines (CH2-CH4) and the combination of the partial gray values of (0,0,0) displayed by the three light emitting elements 921 that are connected to the scan line (SC2) and respectively to the channel lines (CH2-CH4) is reduced as compared to the first case of the prior art, so the high contrast coupling can be alleviated, and the brightness difference between the two light emitting elements 921 that are connected to the channel line (C1) can be reduced.

Figure 6:
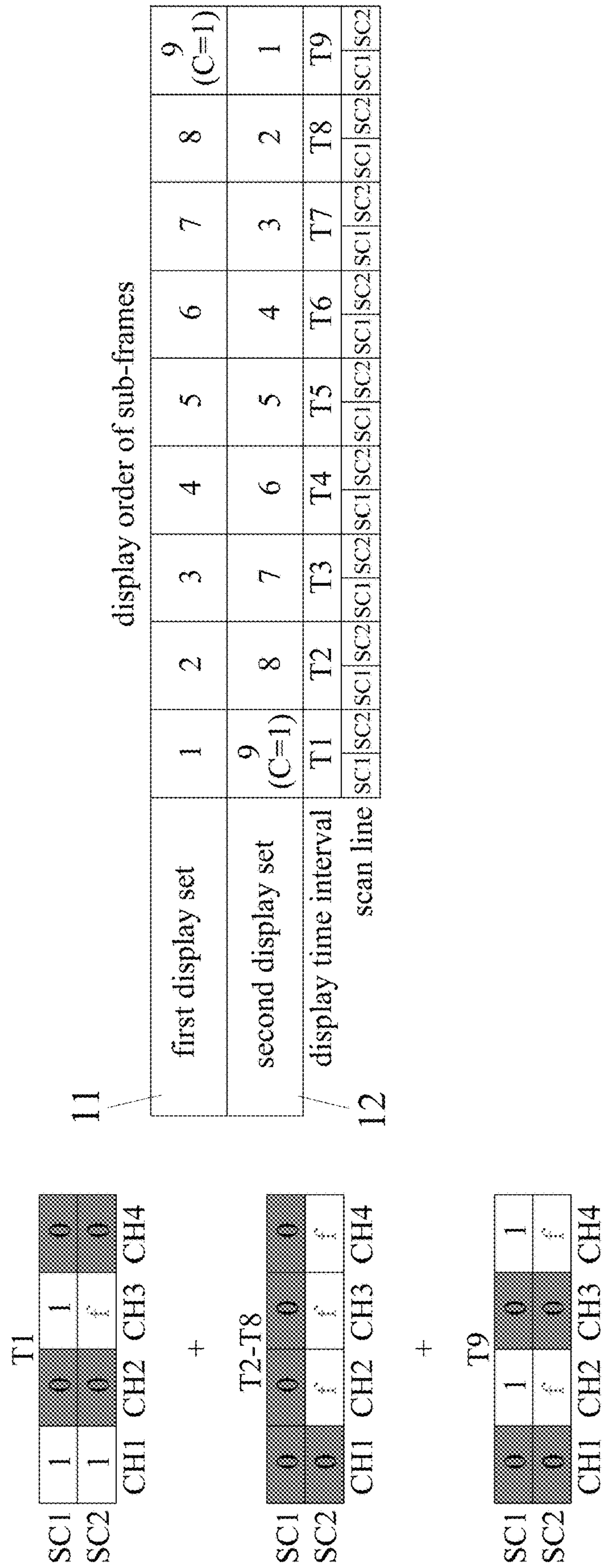
FIG. 6 is a schematic diagram illustrating a third example of the display order and the partial gray values displayed in various display time intervals of the embodiment.

In a third example as shown in FIG. 6, B=3, E=0, and C=1, so N=8, and M=9. The predetermined value is one. The frame gray values of the light emitting elements 921 that are connected to the scan line (SC1) and respectively to the channel lines (CH1-CH4) are (1,1,1,1). The frame gray values of the light emitting elements 921 that are connected to the scan line (SC2) and respectively to the channel lines (CH1-CH4) are (1,F,F,F), where F is the maximum gray value that can be displayed by the light emitting elements 921. According to step (A): with respect to the first one of the sub-frames, the partial gray values of the four light emitting elements 921 that are connected to the scan line (SC1) and respectively to the channel lines (CH1-CH4) are (1,1,1,1), and the partial gray values of the four light emitting elements 921 that are connected to the scan line (SC2) and respectively to the channel lines (CH1-CH4) are (1,f,f,f), where f=F/8; with respect to each of the second one to the eighth one of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,f,f,f); and with respect to the ninth one of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,0,0,0). According to step (C): the one-to-one corresponding relationship indicated by the display order obtained in step (C) with respect to the first display set 11 is that the first, second, third, fourth, fifth, sixth, seventh, eighth and ninth ones of the sub-frames respectively correspond to a first one to a ninth one of the display time intervals (T1-T9); and the one-to-one corresponding relationship indicated by the display order obtained in step (C) with respect to the second display set 12 is that the ninth, eighth, seventh, sixth, fifth, fourth, third, second and first ones of the sub-frames respectively correspond to the first to ninth ones of the display time intervals (T1-T9). According to step (D): in the first one of the display time intervals (T1), the four light emitting elements 921 of the first display set 11 display the corresponding partial gray values of the first one of the sub-frames, and the four light emitting elements 921 of the second display set 12 display the corresponding partial gray values of the ninth one of the sub-frames, that is, the four light emitting elements 921 that are connected to the scan line (SC1) and respectively to the channel lines (CH1-CH4)

display the partial gray values of (1,0,1,0), and the four light emitting elements 921 that are connected to the scan line (SC2) and respectively to the channel lines (CH1-CH4) display the partial gray values of (1,0,f,0); in the second one of the display time intervals (T2), the four light emitting elements 921 of the first display set 11 display the corresponding partial gray values of the second one of the sub-frames, and the four light emitting elements 921 of the second display set 12 display the corresponding partial gray values of the eighth one of the sub-frames, that is, the four light emitting elements 921 that are connected to the scan line (SC1) and respectively to the channel lines (CH1-CH4) display the partial gray values of (0,0,0,0), and the four light emitting elements 921 that are connected to the scan line (SC2) and respectively to the channel lines (CH1-CH4) display the partial gray values of (0,f,f,f); and so on and so forth. Therefore, in the first one of the display time intervals (T1), the difference between the combination of the partial gray values of (0,1,0) displayed by the three light emitting elements 921 that are connected to the scan line (SC1) and respectively to the channel lines (CH2-CH4) and the combination of the partial gray values of (0,f,0) displayed by the three light emitting elements 921 that are connected to the scan line (SC2) and respectively to the channel lines (CH2-CH4) is reduced as compared to the second case of the prior art, so the high contrast coupling can be alleviated, and the brightness difference between the two light emitting elements 921 that are connected to the channel line (C1) can be reduced.

Figure 7:
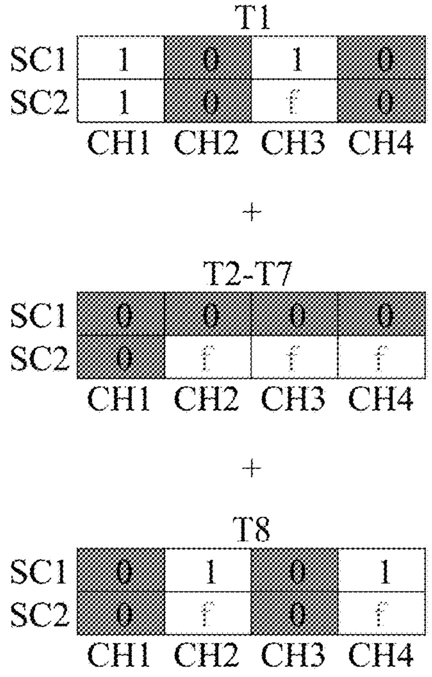
FIG. 7 is a schematic diagram illustrating a fourth example of the display order and the partial gray values displayed in various display time intervals of the embodiment.

In a fourth example as shown in FIG. 7, B=3, E=1, and C=0, so N=7, and M=8. The predetermined value is one. The frame gray values of the light emitting elements 921 that are connected to the scan line (SC1) and respectively to the channel lines (CH1-CH4) are (1,1,1,1). The frame gray values of the light emitting elements 921 that are connected to the scan line (SC2) and respectively to the channel lines (CH1-CH4) are (1,F,F,F). According to step (A): with respect to the first one of the sub-frames, the partial gray values of the four light emitting elements 921 that are connected to the scan line (SC1) and respectively to the channel lines (CH1-CH4) are (1,1,1,1), and the partial gray values of the four light emitting elements 921 that are connected to the scan line (SC2) and respectively to the channel lines (CH1-CH4) are (1,f,f,f), where f=F/7; with respect to each of the second one to the seventh one of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,f,f,f); and with respect to the eighth one of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,0,0,0). According to step (C): the one-to-one corresponding relationship indicated by the display order obtained in step (C) with respect to the first display set 11 is that the first, second, third, fourth, fifth, sixth, seventh and eighth ones of the sub-frames respectively correspond to a first one to an eighth one of the display time intervals (T1-T8); and the one-to-one corresponding relationship indicated by the display order obtained in step (C) with respect to the second display set 12 is that the eighth, seventh, sixth, fifth, fourth, third, second and first ones of the sub-frames respectively correspond to the first to eighth ones of the display time intervals (T1-T8). According to step (D): in the first one of the display time intervals (T1), the four light emitting elements 921 of the first display set 11 display the corresponding partial gray values of the first one of the sub-frames, and the four light emitting elements 921 of the second display set 12 display the corresponding partial gray values of the eighth one of the sub-frames, that is, the four light emitting elements 921 that are connected to the scan line (SC1) and respectively to the channel lines (CH1-CH4) display the partial gray values of (1,0,1,0), and the four light emitting elements 921 that are connected to the scan line (SC2) and respectively to the channel lines (CH1-CH4) display the partial gray values of (1,0,f,0); in the second one of the display time intervals (T2), the four light emitting elements 921 of the first display set 11 display the corresponding partial gray values of the second one of the sub-frames, and the four light emitting elements 921 of the second display set 12 display the corresponding partial gray values of the seventh one of the sub-frames, that is, the four light emitting elements 921 that are connected to the scan line (SC1) and respectively to the channel lines (CH1-CH4) display the partial gray values of (0,0,0,0), and the four light emitting elements 921 that are connected to the scan line (SC2) and respectively to the channel lines (CH1-CH4) display the partial gray values of (0,f,f,f); and so on and so forth. Therefore, in the first one of the display time intervals (T1), the difference between the combination of the partial gray values of (0,1,0) displayed by the three light emitting elements 921 that are connected to the scan line (SC1) and respectively to the channel lines (CH2-CH4) and the combination of the partial gray values of (0,f,0) displayed by the three light emitting elements 921 that are connected to the scan line (SC2) and respectively to the channel lines (CH2-CH4) is reduced as compared to the second case of the prior art, so the high contrast coupling can be alleviated, and the brightness difference between the two light emitting elements 921 that are connected to the channel line (C1) can be reduced.

Figure 8:
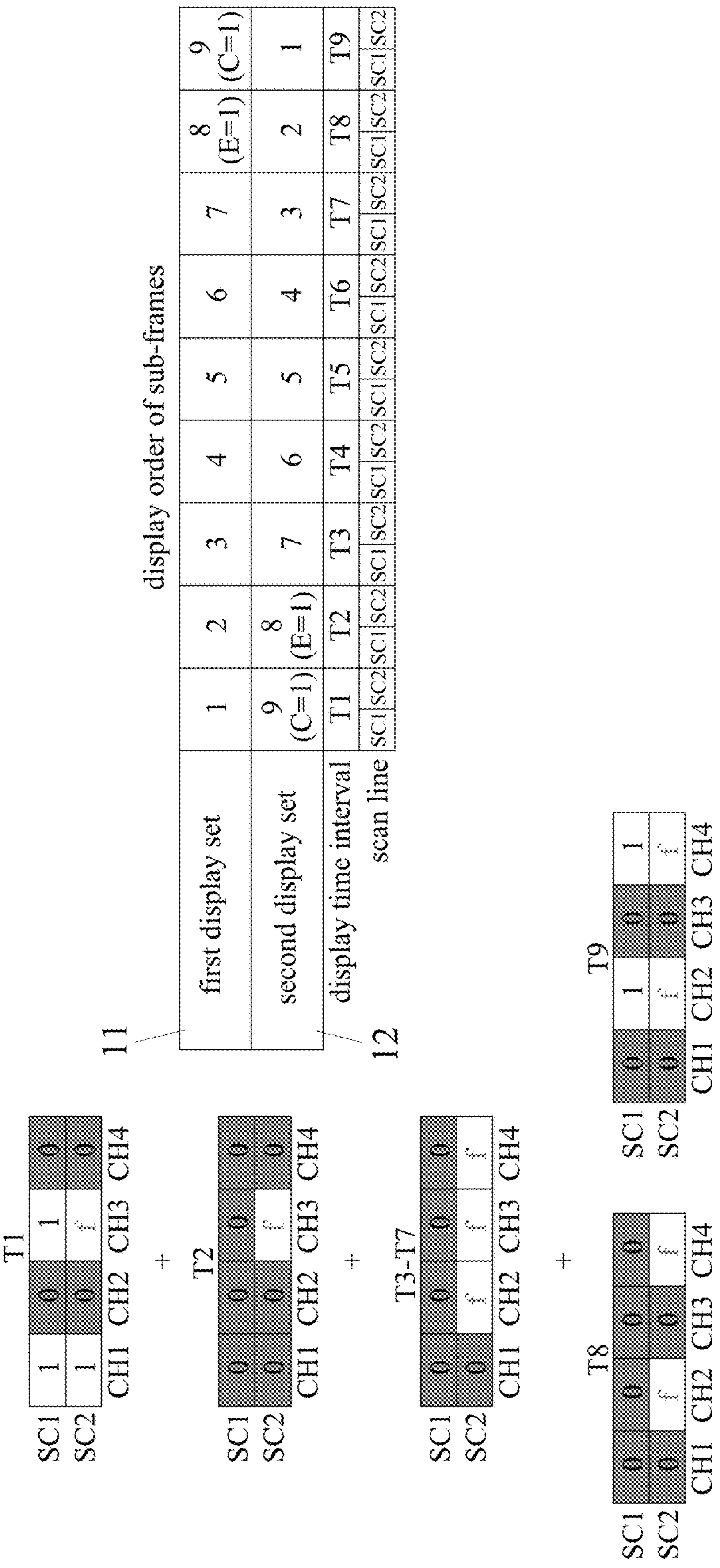
FIG. 8 is a schematic diagram illustrating a fifth example of the display order and the partial gray values displayed in various display time intervals of the embodiment.

In a fifth example as shown in FIG. 8, B=3, E=1, and C=1, so N=7, and M=9. The predetermined value is one. The frame gray values of the light emitting elements 921 that are connected to the scan line (SC1) and respectively to the channel lines (CH1-CH4) are (1,1,1,1). The frame gray values of the light emitting elements 921 that are connected to the scan line (SC2) and respectively to the channel lines (CH1-CH4) are (1,F,F,F). According to step (A): with respect to the first one of the sub-frames, the partial gray values of the four light emitting elements 921 that are connected to the scan line (SC1) and respectively to the channel lines (CH1-CH4) are (1,1,1,1), and the partial gray values of the four light emitting elements 921 that are connected to the scan line (SC2) and respectively to the channel lines (CH1-CH4) are (1,f,f,f), where f=F/7; with respect to each of the second to seventh ones of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,f,f,f); and with respect to each of the eighth and ninth ones of the sub-frames, the partial gray values of the four light emitting elements 921 that are connected to the scan line (SC1) and respectively to the channel lines (CH1-CH4) are (0,0,0,0), and the partial gray values of the four light emitting elements 921 that are connected to the scan line (SC2) and respectively to the channel lines (CH1-CH4) are (0,0,0,0). According to step (C): the one-to-one corresponding relationship indicated by the display order obtained in step (C) with respect to the first display set 11 is that the first, second, third, fourth, fifth, sixth, seventh, eighth and ninth ones of the sub-frames respectively correspond to a first one to a ninth one of the display time intervals (T1-T9); and the one-to-one corresponding relationship indicated by the display order obtained in step (C) with respect to the second display set 12 is that the ninth, eighth, seventh, sixth, fifth, fourth, third, second and first ones of the sub-frames respectively correspond to the first to ninth ones of the display time intervals (T1-T9). According to step (D): in the first one of the display time intervals (T1), the four light emitting elements 921 of the first display set 11 display the corresponding partial gray values of the first one of the sub-frames, and the four light emitting elements 921 of the second display set 12 display the corresponding partial gray values of the ninth one of the sub-frames, that is, the four light emitting elements 921 that are connected to the scan line (SC1) and respectively to the channel lines (CH1-CH4) display the partial gray values of (1,0,1,0), and the four light emitting elements 921 that are connected to the scan line (SC2) and respectively to the channel lines (CH1-CH4) display the partial gray values of (1,0,f,0); in the second one of the display time intervals (T2), the four light emitting elements 921 of the first display set 11 display the corresponding partial gray values of the second one of the sub-frames, and the four light emitting elements 921 of the second display set 12 display the corresponding partial gray values of the eighth one of the sub-frames, that is, the four light emitting elements 921 that are connected to the scan line (SC1) and respectively to the channel lines (CH1-CH4) display the partial gray values of (0,0,0,0), and the four light emitting elements 921 that are connected to the scan line (SC2) and respectively to the channel lines (CH1-CH4) display the partial gray values of (0,0,f,0); and so on and so forth. Therefore, in the first one of the display time intervals (T1), the difference between the combination of the partial gray values of (0,1,0) displayed by the three light emitting elements 921 that are connected to the scan line (SC1) and respectively to the channel lines (CH2-CH4) and the combination of the partial gray values of (0,f,0) displayed by the three light emitting elements 921 that are connected to the scan line (SC2) and respectively to the channel lines (CH2-CH4) is reduced as compared to the second case of the prior art, so the high contrast coupling can be alleviated, and the brightness difference between the two light emitting elements 921 that are connected to the channel line (C1) can be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light emission control method to be implemented by a driver circuit and for controlling a display, the display including a plurality of light emitting elements that are to be divided into a plurality of display sets, said light emission control method comprising steps of:

(A) generating a number (M) of sub-frames based on an image frame, where $M=2^B+C=(N+E)+C$, in which $B>0$, $N>0$, $E\geq 0$, and $C\geq 0$, the image frame corresponds to a display time period, and contains frame gray values of the plurality of light emitting elements, the display time period includes a number (M) of display time intervals, each of the number (M) of sub-frames contains partial gray values of the plurality of light emitting elements, and with respect to each of the plurality of light emitting elements, the partial gray value of the light emitting element that is contained in each of a first one to an $N^{th}$ one of the number (M) of sub-frames is greater than or equal to zero, and a sum of the partial gray values of the light emitting element that are respectively contained in the first one to the $N^{th}$ one of the number (M) of sub-frames is equal to the frame gray value of the light emitting element;

(B) obtaining a display set arrangement that indicates which one(s) of the plurality of light emitting elements is/are included in each of the plurality of display sets;

(C) obtaining a display order of the number (M) of sub-frames in the number (M) of display time intervals, where the display order indicates, with respect to each of the plurality of display sets, a one-to-one corresponding relationship between the number (M) of sub-frames and the number (M) of display time intervals, and the one-to-one corresponding relationships indicated by the display order with respect to the plurality of display sets are different from each other; and (D) in each of the number (M) of display time intervals, controlling each of the plurality of display sets as indicated by the display set arrangement to display one of the number (M) of sub-frames that corresponds to the display time interval according to the one-to-one corresponding relationship indicated by the display order with respect to the display set.

2. The light emission control method as claimed in claim 1, wherein $C\leq 2^B$.

3. The light emission control method as claimed in claim 1, wherein, in step (A):

with respect to each of the plurality of light emitting elements, the frame gray value of the light emitting element is cyclically allocated to the sub-frames from the first one to the $N^{th}$ one of the number (M) of sub-frames by an amount, so as to obtain the partial gray values of the light emitting element that are respectively contained in the first one to the $N^{th}$ one of the number (M) of sub-frames, where the amount is smaller than or equal to a predetermined value.

4. The light emission control method as claimed in claim 3, wherein, in step (A):

with respect to each of the plurality of light emitting elements, for each allocation of the frame gray value of the light emitting element to one of the first one to the $N^{th}$ one of the number (M) of sub-frames, the amount is equal to the predetermined value if a remaining portion of the frame gray value of the light emitting element before the allocation is greater than or equal to the predetermined value, and is equal to the remaining portion of the frame gray value of the light emitting element before the allocation if the remaining portion of the frame gray value of the light emitting element before the allocation is smaller than the predetermined value.

5. The light emission control method as claimed in claim 3, wherein:

each of the frame gray values contained in the image frame is A-bits wide; and the predetermined value is greater than or equal to one, and is smaller than or equal to $2^A/N$.

6. The light emission control method as claimed in claim 1, wherein:

each of the frame gray values contained in the image frame is A-bits wide; and each of the partial gray values contained in the first one to the $N^{th}$ one of the number (M) of sub-frames is smaller than or equal to $2^A/N$.

7. The light emission control method as claimed in claim 1, wherein:

in the one-to-one corresponding relationships indicated by the display order with respect to the plurality of display sets, the first one of the number (M) of sub-frames corresponds to different ones of the number (M) of display time intervals.

8. The light emission control method as claimed in claim 1, wherein, with respect to each of the plurality of light emitting elements:

when (E+C)>0, the partial gray value of the light emitting element that is contained in each of an $(N+1)^{th}$ one to an $M^{th}$ one of the number (M) of sub-frames is zero.

9. A light emission control method to be implemented by a driver circuit and for controlling a display, the display including a plurality of light emitting elements that are divided into a plurality of display sets, said light emission control method comprising steps of:

(A) generating a number (M) of sub-frames based on an image frame, where $M=2^B+C=(N+E)+C$, in which B>0, N>0, E≥, and C≥, the image frame corresponds to a display time period, and contains frame gray values of the plurality of light emitting elements, the display time period includes a number (M) of display time intervals, each of the number (M) of sub-frames contains partial gray values of the plurality of light emitting elements, and with respect to each of the plurality of light emitting elements, the partial gray value of the light emitting element that is contained in each of a first one to an $N^{th}$ one of the number (M) of sub-frames is greater than or equal to zero, and a sum of the partial gray values of the light emitting element that are respectively contained in the first one to the $N^{th}$ one of the number (M) of sub-frames is equal to the frame gray value of the light emitting element; and (B) in each of the number (M) of display time intervals, controlling each of the plurality of display sets to display one of the number (M) of sub-frames that corresponds to the display time interval, where with respect to each of the plurality of display sets, the number (M) of sub-frames correspond to the number (M) of display time intervals in a one-to-one corresponding relationship, and the one-to-one corresponding relationships with respect to the plurality of display sets are different from each other.

10. The light emission control method as claimed in claim 9, wherein $C \le 2^B$.

11. The light emission control method as claimed in claim 9, wherein, in step (A):

with respect to each of the plurality of light emitting elements, the frame gray value of the light emitting element is cyclically allocated to the sub-frames from the first one to the $N^{th}$ one of the number (M) of sub-frames by an amount, so as to obtain the partial gray values of the light emitting element that are respectively contained in the first one to the $N^{th}$ one of the number (M) of sub-frames, where the amount is smaller than or equal to a predetermined value.

12. The light emission control method as claimed in claim 11, wherein, in step (A):

with respect to each of the plurality of light emitting elements, for each allocation of the frame gray value of the light emitting element to one of the first one to the $N^{th}$ one of the number (M) of sub-frames, the amount is equal to the predetermined value if a remaining portion of the frame gray value of the light emitting element before the allocation is greater than or equal to the predetermined value, and is equal to the remaining portion of the frame gray value of the light emitting element before the allocation if the remaining portion of the frame gray value of the light emitting element before the allocation is smaller than the predetermined value.

13. The light emission control method as claimed in claim 11, wherein:

each of the frame gray values contained in the image frame is A-bits wide; and the predetermined value is greater than or equal to one, and is smaller than or equal to $2^A/N$.

14. The light emission control method as claimed in claim 9, wherein:

each of the frame gray values contained in the image frame is A-bits wide; and each of the partial gray values contained in the first one to the $N^{th}$ one of the number (M) of sub-frames is smaller than or equal to $2^A/N$.

15. The light emission control method as claimed in claim 9, wherein:

in the one-to-one corresponding relationships with respect to the plurality of display sets, the first one of the number (M) of sub-frames corresponds to different ones of the number (M) of display time intervals.

16. The light emission control method as claimed in claim 9, wherein, with respect to each of the plurality of light emitting elements:

when (E+C)>0, the partial gray value of the light emitting element that is contained in each of an $(N+1)^{th}$ one to an $M^{th}$ one of the number (M) of sub-frames is zero.

* * * * *